(12) United States Patent
Ingles et al.

(10) Patent No.: US 8,342,785 B1
(45) Date of Patent: Jan. 1, 2013

(54) TRAILER FOR TRANSPORT OF STANDARDIZED SHIPPING CONTAINERS

(75) Inventors: Michael B. Ingles, Titusville, NJ (US); Jason T. Ispanky, Hopewell, NJ (US)

(73) Assignee: WorldWater & Solar Technologies, Inc., Princeton, NJ (US)

( * ) Notice: Subject to any disclaimer, the term of this patent is extended or adjusted under 35 U.S.C. 154(b) by 0 days.

(21) Appl. No.: 13/199,487

(22) Filed: Aug. 31, 2011

(51) Int. Cl.
*B60P 1/64* (2006.01)

(52) U.S. Cl. .......................................................... 410/77

(58) Field of Classification Search .................... 410/77, 410/46, 56; 280/656
See application file for complete search history.

(56) References Cited

U.S. PATENT DOCUMENTS

| | | | | |
|---|---|---|---|---|
| 2,901,986 A * | 9/1959 | Furrer | | 410/56 |
| 4,563,117 A * | 1/1986 | Krug et al. | | 410/56 |
| 4,592,693 A * | 6/1986 | Perrot | | 414/495 |
| 4,686,907 A * | 8/1987 | Woollam et al. | | 105/4.1 |
| 4,834,608 A * | 5/1989 | Middaugh et al. | | 414/525.1 |
| 6,237,976 B1 * | 5/2001 | Whitt, Jr. | | 294/82.1 |
| 6,969,104 B2 * | 11/2005 | Green | | 296/26.09 |
| 7,490,856 B1 * | 2/2009 | Kuhns | | 280/789 |
| 7,674,087 B2 * | 3/2010 | He et al. | | 414/802 |
| 2005/0057059 A1 * | 3/2005 | Green | | 296/26.09 |
| 2006/0170173 A1 * | 8/2006 | Darling | | 280/79.2 |
| 2008/0069657 A1 * | 3/2008 | George | | 410/96 |
| 2010/0226730 A1 * | 9/2010 | He et al. | | 410/31 |
| 2011/0140393 A1 * | 6/2011 | Padilla et al. | | 280/490.1 |

* cited by examiner

*Primary Examiner* — H Gutman

(57) ABSTRACT

A universal trailer designed to accommodate and transport a container of a family of containers having a standardized base footprint has a simple horizontal frame bed sized to the standardized base footprint of the container. The compact size and low profile of the trailer allows the entire trailer with mounted container to be rolled into and out of standard intermodal containers as an integrated unit. Securement of the container to the trailer is by a simple but reliable sliding rod mechanism which engages tabs on the container. An adjustable height hitch and 12/24 VDC compatible electrical system allow the trailer to be towed by almost any vehicle. The trailer greatly shipment time by allowing trailer interchange among different parties having different tow vehicles, by facilitating loading and unloading into and out of standard intermodal containers, and providing quick and easy yet reliable securement of the container to the trailer.

14 Claims, 6 Drawing Sheets

TRAILER FOR TRANSPORT OF STANDARDIZED SHIPPING CONTAINERS

BACKGROUND OF THE INVENTION

1. Field of the Invention

This invention pertains generally to transport trailers, and more particularly to transport trailers for standardized shipping containers, and most particularly to transport trailers for standardized shipping containers adapted for use with ISO or other intermodal containers.

2. Description of Related Art

The standard ISU series of containers, manufactured by AAR Mobility Systems, Cadillac, Mich., are widely used by a number of different users whose capabilities and needs vary widely. These users include but are not limited to the U.S. and foreign military, private and public international aid organizations, and various commercial and private users. As an example, the ISU-60 Four Door is a container box approximately 108 in. long, 88 in. wide, and 60 in. high. The box has four doors, two on each side, each about 49 in. tall and 45 in. wide. While different containers in the ISU series differ in height and other features, e.g. The ISU-90 is 90 in. high, they all have the same base (length by width) footprint.

However, there has not been an economical and compact transport system available to simplify movement of these containers from an airfield or seaport to their final destination in the field. This is a significant problem, particularly when the containers are handled by a number of different parties during their shipment and deployment, i.e. the container passes though different hands on its way to its final destination, each using different equipment having different capabilities. For example, the U.S. military is now involved in an increasing number of humanitarian aid efforts in the U.S. and around the world, often involving civilian participants or foreign military. U.S. military transport systems may be incompatible with the transport systems used by others, yet they may all be required to handle the container at various points during its transport to its final destination.

Commercial and other freight today is often shipped in intermodal containers. Intermodal containers are containers typically made of corrugated weathering steel and built to standardized dimensions, particularly dimensions set by the International Shipping Organization (ISO), to facilitate transport. Exemplary dimensions are lengths of 20 ft., 40 ft., 45 ft., 48 ft., and 53 ft., with 48 and 53 ft. being common in the U.S., and with typical widths and heights of 8 ft. Intermodal containers, also frequently called ISO containers, freight containers, shipping containers, or just containers, once loaded, can be stacked, transported efficiently over long distances, and transferred from one mode of transport to another—container ships, rail, semi-trailer trucks—without being opened.

ISU containers can conveniently be loaded into ISO or other intermodal containers for shipping. The widths of the ISU containers are only slightly smaller than the widths of the ISO containers; depending on the length of the ISO or other intermodal container, two or more ISU containers may be placed therein. It is desirable to facilitate the loading and unloading of ISU containers into and out of ISO or other intermodal containers. It is also desirable to facilitate the transport of the ISU containers to and from the ISO containers.

The transport of ISU containers to the field is often under extreme duress, e.g. during a battle or a humanitarian aid crisis, where time is critical. Transport may be over difficult terrain, and must be done quickly, so that securing the containers is of primary importance. Also immediate access to the containers is essential. Time lost in loading and unloading the ISU containers into and from the ISO containers or in transferring the ISU containers between different parties or in engaging or disengaging a securing system may be a critical loss of time for the mission. It is desirable to have a transport system that minimizes the time for loading and unloading the ISU container into and from the ISO containers and for transferring the ISU containers between different parties and for engaging or disengaging a securing system. Military tow vehicles (primary movers) usually have high hitches, whereas commercial tow vehicles usually have low hitches. Also military vehicles generally operate on 24 V while commercial vehicles operate on 12 V. It is also desirable to provide a transport system in which various tow vehicles, including military and commercial tow vehicles, may be readily interchanged.

Accordingly it is desirable to provide a transport trailer designed to accommodate containers having a preselected base footprint. It is further desirable to provide a transport trailer that facilitates transfer between different parties having different capabilities and using different tow vehicles, facilitates loading and unloading into and out of ISO and other intermodal containers, and facilitates securing and unsecuring of the container to the trailer.

BRIEF SUMMARY OF THE INVENTION

An aspect of the invention is a universal trailer designed for transporting a container of a family of containers having a preselected base footprint, the trailer having a substantially horizontal frame bed configured substantially to the size of the preselected base footprint of the container; a dual axle wheel assembly on which the frame bed is mounted, the wheel assembly having a substantially low profile; a hitch attached to the frame bed and having an adjustable height to allow for connecting the trailer to tow vehicles having tow hitch posts at different heights; and a lock down mechanism for securing a container to the frame bed; wherein the trailer and a container loaded and secured thereon form an integrated unit that is easily transported to a destination by a number of different parties having different capabilities and by a number of different modes without unloading the container from the trailer.

Another aspect of the invention is a method of transporting a container of a family of containers having a preselected base footprint, by providing a trailer sized substantially to the size of the preselected base footprint of the container; loading the container onto the trailer; securing the container to the trailer; and towing the trailer from a starting point to a destination.

Further aspects of the invention will be brought out in the following, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, without departing from the basic concepts as disclosed herein.

The invention is a trailer designed to accommodate and transport a family of shipping containers having a standardized base footprint. The invention greatly reduces shipment time by allowing ready interchange of the trailer among different parties having different capabilities and using different tow vehicles, by facilitating loading and unloading into and out of ISO and other intermodal containers, and providing quick and easy yet reliable securement of the container to the trailer. The foregoing and other objectives are achieved by a trailer formed of a simple frame bed sized to the base footprint of the containers. The compact size and low profile of the trailer allows the entire trailer with mounted container to be rolled into and out of an ISO or other intermodal container as an integrated unit. Securement of the container to the trailer is by a simple but reliable sliding rod mechanism which engages tabs on the container. An adjustable height hitch and 12/24 VDC compatible electrical system allow the trailer to be towed by almost any vehicle.

Figure 1:
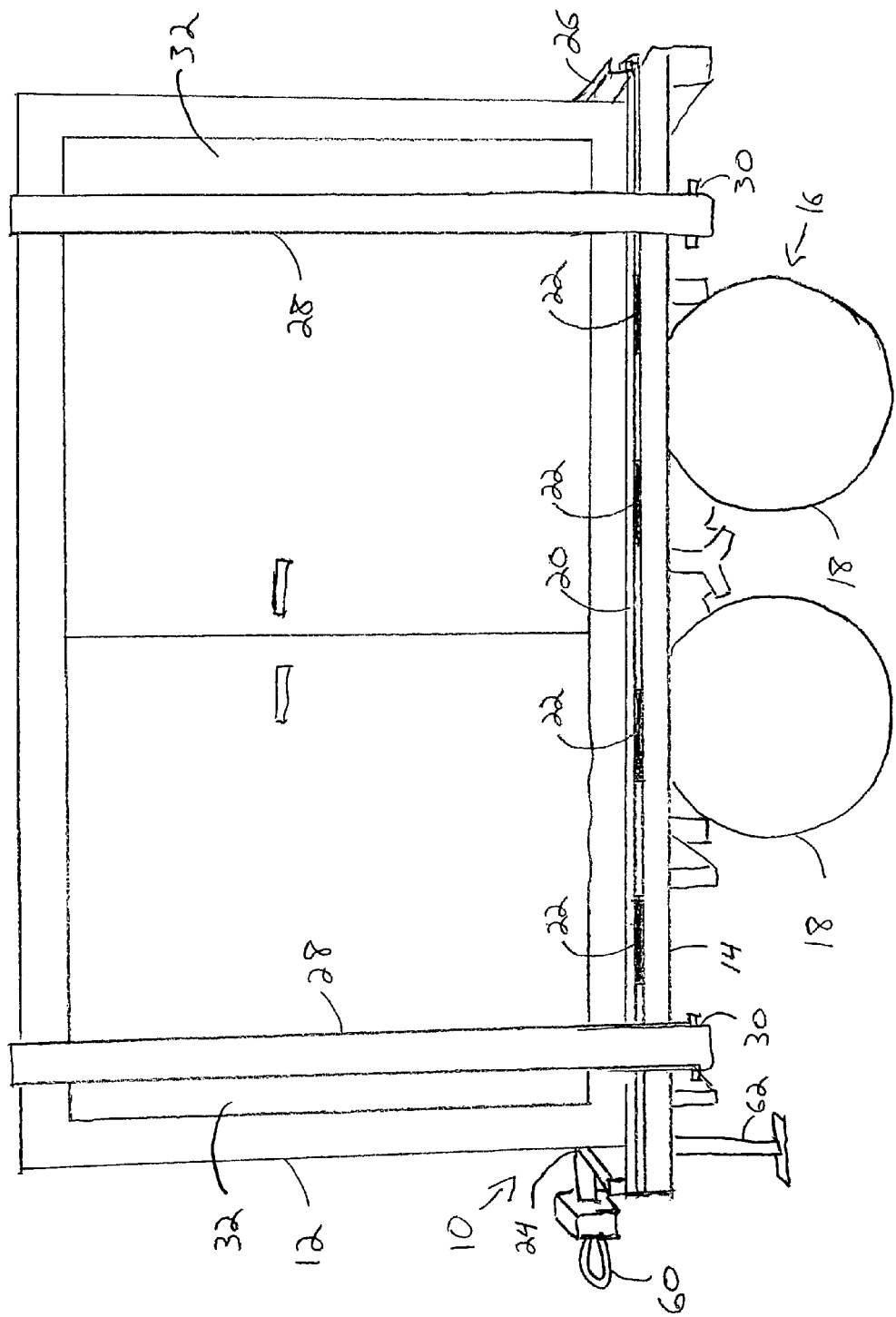
FIG. 1 is a side view of a trailer of the invention loaded with a container, with container doors closed.

FIG. 1 shows a trailer 10 of the invention loaded with a container 12. Trailer 12 is formed of a substantially horizontal simple frame bed 14 supported by a dual axle wheel system 16. Frame bed 14 has a footprint substantially the same as the base footprint of container 12. The tires 18 mounted on the dual axle wheel system 16 are relatively small, allowing the height of the frame bed 14 to be relatively low, and relatively closely spaced, allowing for ease of turning trailer 10.

Container 12 is locked down to frame bed 14 by a rod 20 on each side of container 12. Rod 20 engages tabs 22 on container 12, and locks into front and rear vertical end members 24, 26 respectively rising from frame bed 14. The details of the locking mechanism are described more fully below with reference to FIGS. 3A-C. Container 12 is optionally further secured to frame bed 14 by straps 28 that are retractably dispensed by reels 30.

Access to container 12 is readily obtained while the container 12 is mounted on trailer 10. After releasing straps 28, which are rolled back up onto reels 30, doors 32 of container 12 may swing open. No part of the trailer structure impedes the opening of doors 32. Thus access to the contents of container 12 is immediate upon arrival at a destination, without having to wait for the container 12 to be unloaded from trailer 10.

Figure 2:
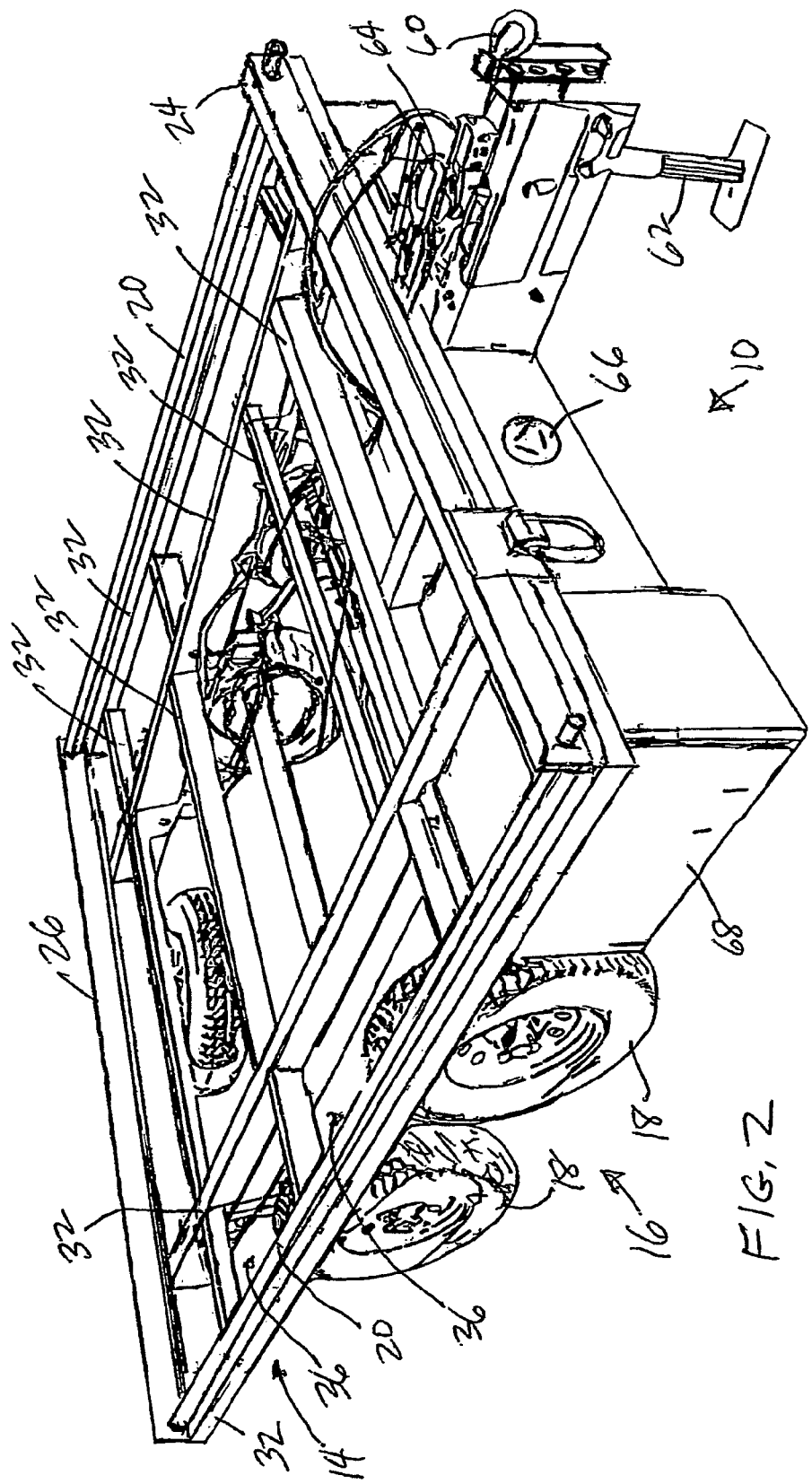
FIG. 2 is a perspective view of a trailer of the invention.

FIG. 2 shows further details of the structure and features of trailer 10. As previously described trailer 10 is formed of a frame bed 14 mounted on a dual axle wheel system 16. Frame bed 14 is formed of a plurality of spaced interconnected frame members 32, extending either along the length or width of the trailer 10, on which the container 12 will rest. The specific number and spacing of the frame members 32 is a matter of design choice. Front and rear vertical end members 24, 26 extend upwards slightly from frame bed 14. Securing rods 20 extend between vertical end members 24, 26 and are releasably fastened thereto. By forming the trailer 10 of a frame structure without a full deck, weight is greatly reduced while strength is maintained. End members 24, 26, besides fastening the securing rods 20, provide stops preventing the container from sliding forward or backward.

Tires 18 are positioned between gaps 36 defined between spaced frame members 32. The tires 18 are also relatively small in size and frame bed 14 is positioned just above the tires 18. This structure allows the trailer 10 to have the lowest profile possible since during vertical bounce of the trailer 10, the frame bed 14 can move downward around the tires 18 via the gaps 36, i.e. the tires 18 can flex up into the gaps 36 between frame elements.

An important feature of the trailer of the invention is the lock down mechanism for securing the container to the trailer. The lock down mechanism of the invention advantageously is easy to operate and requires minimum time and tools to secure the container after loading onto the trailer and for unsecuring the container for unloading.

Figure 3A:
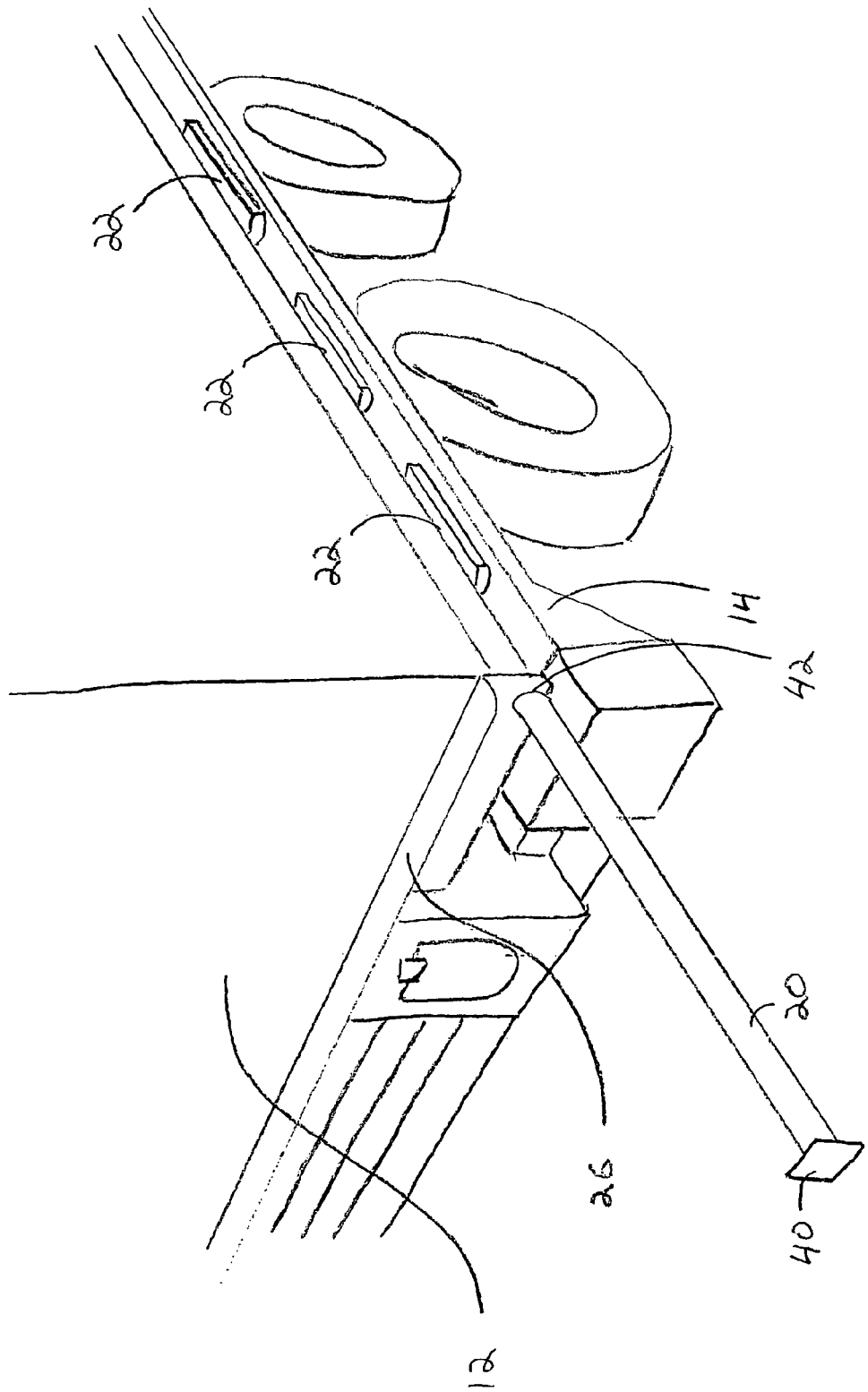
FIGS. 3A-C show details of the lock down mechanism of the trailer of the invention.

As shown in FIG. 3A, a container 12 has been loaded onto the frame bed 14. A securing rod 20 that has an end cap 40 is slid forward through an aperture 42 formed in vertical rear end member 26 extending upwards from frame bed 14. Container 12 has a plurality of spaced tabs 22 extending out from the two vertical sides thereof, substantially at the bottom thereof. These tabs 22 are typically a standard feature of the shipping containers 12, provided for transport of the containers by plane or helicopter. Tabs 22 allow the container 12 to be latched down to the floor of an airplane or to a platform or pallet being lifted by a helicopter so that the containers cannot shift during flight. The tabs 22 are slightly curved, with the outer ends of tabs 22 extend slightly upward so that the tabs 22 define a channel therealong, as more clearly shown in FIG. 3B. The aperture 42 in rear vertical member 26 has a size that rod 20 can slide therethrough easily but snuggly. The aperture 42 is positioned so that rod 20 slides along the side of container 12 in the channel defined by the tabs 22.

Figure 3B:
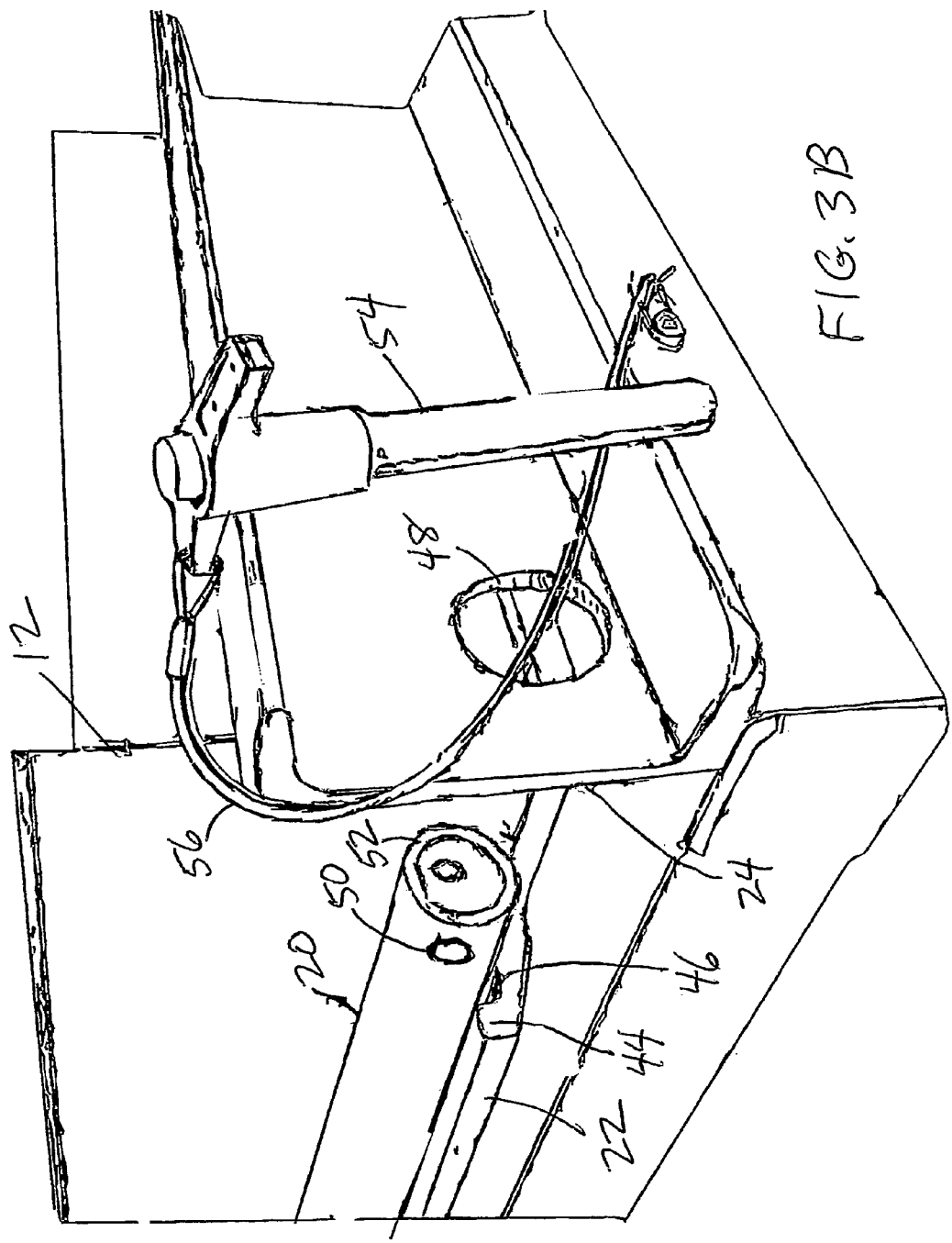

As shown in FIG. 3B, tab 22 curves slightly upward, and has a substantially vertical end portion 44, thereby defining a channel 46 along its upper surface and adjacent to the side of container 12. Rod 20 is slid forward through aperture 42 in rear end vertical member 26 and along channel 46 from the back of trailer 10 towards the front. Front end vertical member 24 has an aperture 48 sized and positioned to receive the forward end of rod 20. Rod 20 has an aperture 50 formed therethrough near the front end 52 thereof. A locking pin 54 is attached by a cable 56 to the frame bed 14 so that it cannot be lost.

Figure 3C:
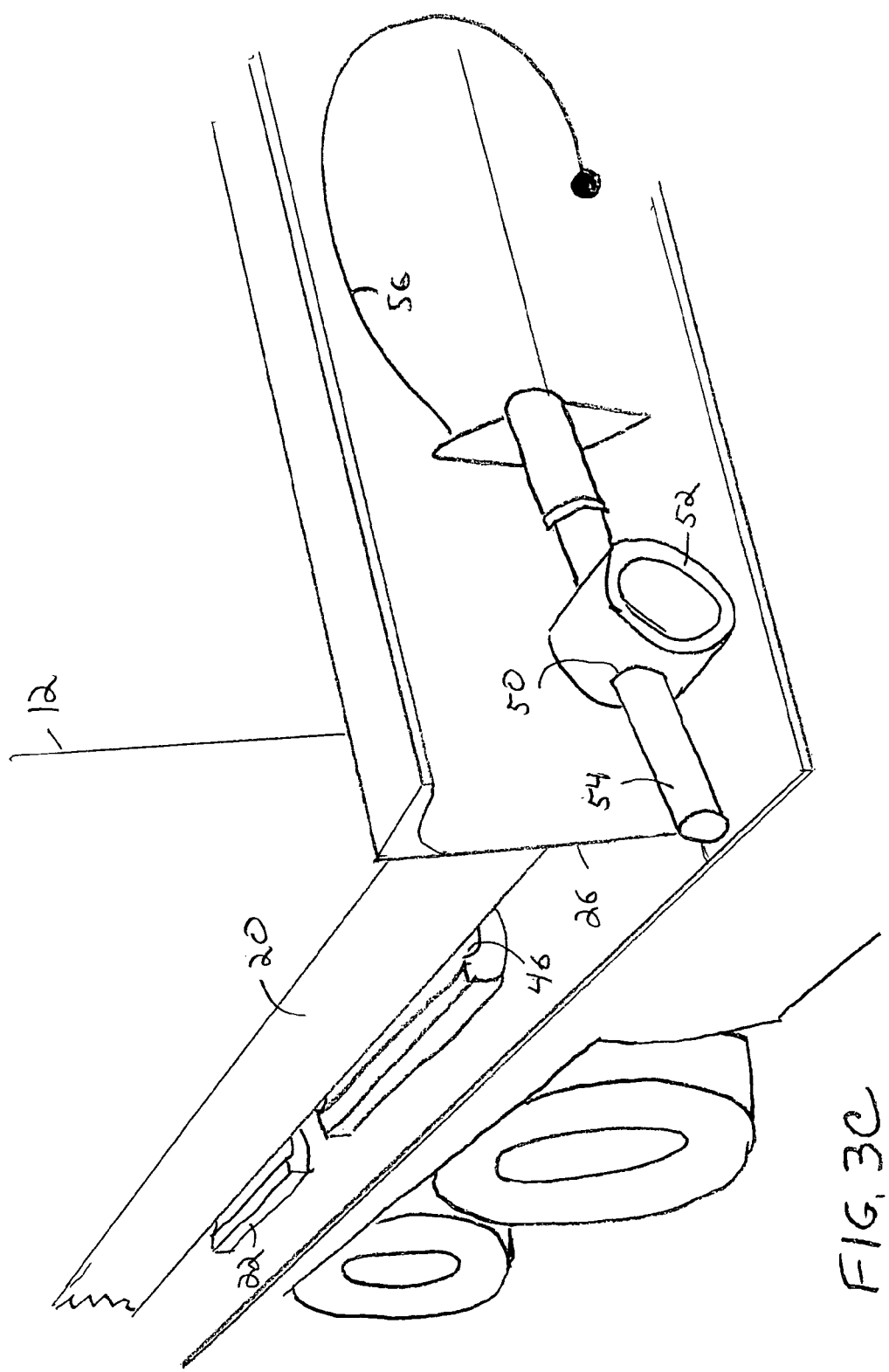

When the end 52 and the aperture 50 of rod 20 pass through aperture 48 in front vertical end member 24, pin 54 is inserted through aperture 50 of rod 20, thereby securing rod 20 and container 12 in place, as shown in FIG. 3C. The length of rod 20 is such that when end cap 40 abuts rear vertical end member 26, the aperture 50 near the front end 52 of rod 20 just passes through aperture 48 in front vertical end member 24 so that pin 54 can be inserted. Thus rod 20 is secured snuggly between front and rear vertical members 24, 26. Since a rod 20 lies in channel 46 formed by tabs 22 on each side of container 12, the container 12 is thereby secured in place.

Figure 4:
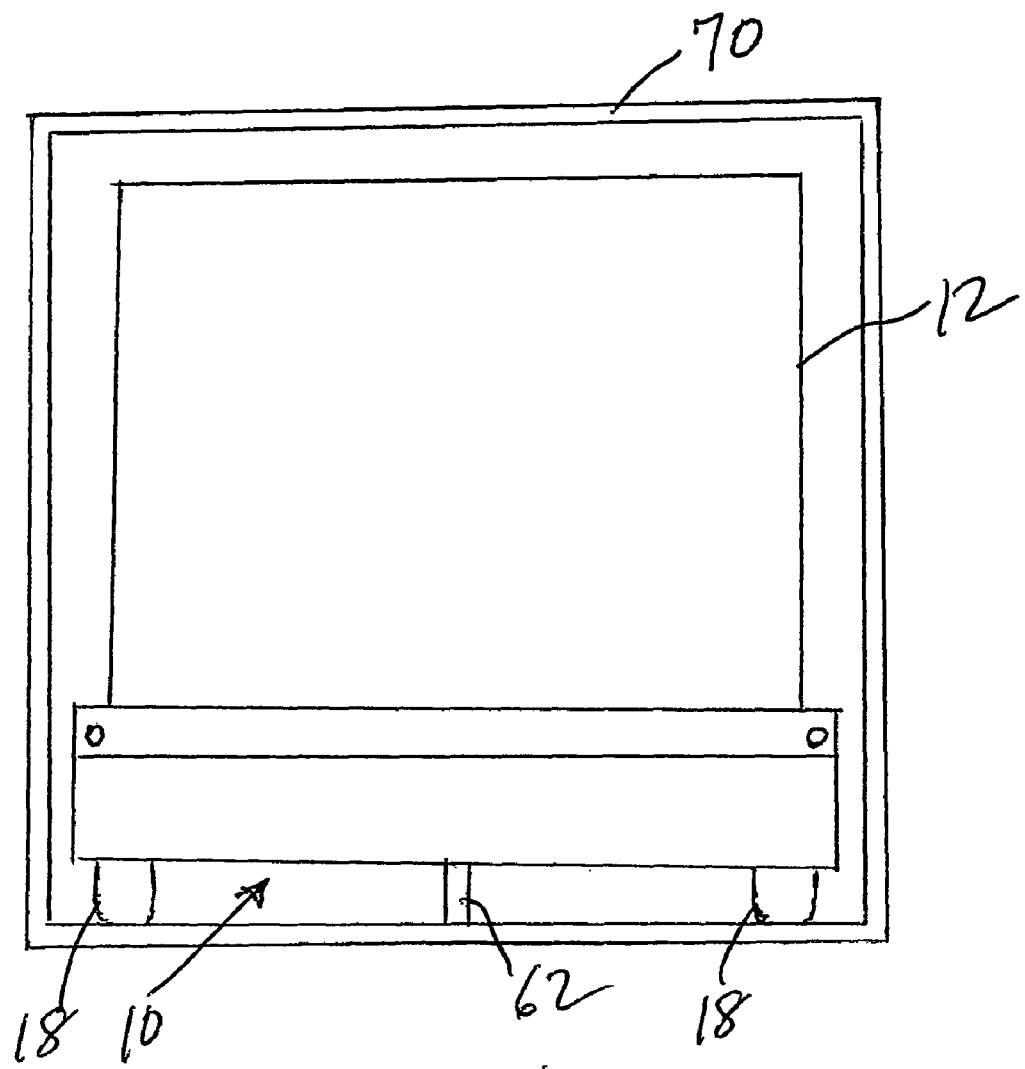
FIG. 4 shows a trailer of the invention loaded with a container, the trailer and container loaded into an ISO or other intermodal container.

A great advantage of the trailer design of the invention is that trailer 10 forms with container 12 an integrated trailer/container unit that can easily be loaded and unloaded from a standard ISO or other intermodal container as a unit. As shown in FIG. 4, a container 12 is loaded onto and secured to a trailer 10 as previously described. The trailer 10 with container 12 is placed within an intermodal container 70, e.g. an ISO container. Container 12 is generally sized to fit snuggly inside container 70, i.e. the width of container 12 is slightly less than the width of container 70. Loading of container 12 into container 70 is easily accomplished since container 12 sits on wheeled trailer 10. Trailer 10 has essentially the same width as container 12 so it also fits snuggly into container 70. Trailer 10 has a low height so that the total height of trailer 10 and container 12 fits within container 70.

To load container 12 into container 70, trailer 10 is simply rolled, either forwards or backwards, into container 70 carrying container 12. Container 12 then remains on trailer 10 during shipment of container 70, the combination of trailer 10 and container 12 being supported on tires 18 and support leg 62 of trailer 10. When container 70 reaches its final destination, container 12 is unloaded by simply rolling trailer 10 out of container 70; it is already on a trailer so it is ready for a tow vehicle to be on its way. Thus no time is lost at the starting point in unsecuring and unloading container 12 from a first carrier, and loading it into container 70, and at the destination point in first unloading it from the container 70 and then loading and securing it onto a second carrier. The integrated functionality of trailer 10 and container 12 allows the trailer to be quickly unhitched from a first tow vehicle at the starting point and rolled into container 70, then rolled out at the destination point and hitched to a second tow vehicle.

Some additional features of the trailer of the invention, shown in FIGS. 1, 2 are an adjustable height hitch 60 is attached to the front end of the trailer 10. Hitch 60 has an extended height range and allows the trailer to be hitched to virtually any vehicle, military or civilian, thereby facilitating quick interchange among different parties during the transportation of the container to its final destination. Since the trailer can readily be adapted to be towed by many different vehicles, no time will be lost unloading the container from one trailer and loading it onto another. Thus the transfer can take place virtually anywhere, even when no loading/unloading equipment is available. This is a great advantage over having to wait for loading/unloading equipment to arrive or having to go to a location, which may be far off course, where such equipment is available.

A support leg 62 is also attached to the front of trailer 10 to support the front of the trailer when the trailer is not hitched to a tow vehicle. A manually operated parking brake 64 is also provided at the front end of trailer 10 for additional safety. Parking brake 64 is connected to the dual axle wheel system 16 to provide hydraulic braking on both axles. Parking brake 64 may be engaged when trailer 10, either unloaded or loaded with container 12, is temporarily parked, or loaded into an ISO or other intermodal container. The electrical system plug 66 representing the electrical system through which the trailer can be connected to and powered by either a 12 VDC or 24 VDC vehicle is also mounted in front end of trailer 10. This ability to be connected electrically to different vehicles also enhances the ability of rapidly transferring the container to different parties since it does not have to be transferred to a tow vehicle compatible trailer since the present trailer is universally compatible with most tow vehicles. An integrated trailer support kit 68 may also be attached to trailer 10 for carrying various supplies and tools.

The invention also includes a method of transporting a container of a family of containers having a preselected base footprint, by providing a trailer as described above sized substantially to the size of the preselected base footprint of the container; loading and securing the container onto the trailer; and towing the trailer from a starting point to a destination. The trailer with container may be towed by different tow vehicles using an adjustable height hitch to facilitate hitching the trailer to different vehicles. The trailer with container may be loaded and unloaded as an integrated unit into and out of an ISO or other intermodal container.

The invention thus provides an economical and compact universal trailer for efficiently transporting containers having a preselected base footprint to a final destination, using a variety of transport modes carried out by different parties using different equipment. The trailer is particularly applicable to transporting the ISU series of containers. In one embodiment, the trailer is a tandem axle 7,000 lb. GVW trailer.

The invention results in an integrated trailer/container unit when a container is loaded onto and secured to the trailer. This integrated unit allows the container to be transported without having to be unloaded and transferred at various points along the way. The integrated unit is easy to transport because the trailer can be connected to various tow vehicles that differ in hitch post height and electrical system voltage. The integrated unit can also fit inside a standard ISO or other intermodal container for transport by ship, rail or semi-tractor trailer. The containers are easily secured to the trailers to form the integrated unit by a simple locking mechanism that engages tabs that are a standard feature of the containers, and can be easily unsecured for unloading of the containers. The trailer allows full access to the container while it is secured to the trailer.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A universal trailer designed for transporting a container of a family of containers, comprising:
    a substantially horizontal frame bed configured substantially to the size of the container;
    a dual axle wheel assembly on which the frame bed is mounted, the wheel assembly having a substantially low profile and comprising trailer wheels;
    a hitch attached to the frame bed and having an adjustable height to allow for connecting the trailer to tow vehicles having tow hitch posts at different heights; and
    a lock down mechanism attached to the frame bed for securing the container to the frame bed;
    wherein the container comprises a plurality of spaced tabs extending outwards from the bottom of opposed lateral sides, and the lock down mechanism comprises a pair of rods, one on each lateral side of the container, engaging the tabs, and releasably fastened at the front and rear of the trailer;
    wherein the trailer and the container loaded and secured thereon form an integrated unit that is easily transported to a destination without unloading the container from the trailer.

2. The trailer of claim 1 further comprising vertical front and rear end members extending upwards from the frame bed at the front and rear thereof, the end members containing a pair of aligned apertures through which the rods pass.

3. The trailer of claim 2 wherein each rod further comprises an end cap at one end thereof and a rod aperture through the rod near the other end thereof, wherein each rod is inserted into one of the apertures in the rear end member and slid forward until the end cap contacts the rear end member, the rod being of a length such that when the end cap contacts the rear end member, the rod aperture at the other end just passes through the aligned aperture in the front end member, and further comprising a pin which engages the rod aperture to releasably secure the rod between the rear and front end members.

4. The trailer of claim 3 wherein the tabs curve upwards defining a channel therealong, and wherein the rods engage the channels.

5. The trailer of claim 2 wherein the tabs curve upwards defining a channel therealong, and wherein the rods engage the channels.

6. The trailer of claim 2 wherein the tabs curve upwards defining a channel therealong, and wherein the rods engage the channels.

7. The trailer of claim 1 wherein the frame bed comprises a plurality of interconnected spaced frame elements.

8. The trailer of claim 7 wherein the frame elements define gaps aligned with the trailer wheels into which the trailer wheels flex during vertical bounce of the trailer.

9. The trailer of claim 1 wherein the trailer is sized so that the trailer with the container secured thereon fit snuggly into an intermodal container.

10. The trailer of claim 9 wherein the trailer has a width slightly smaller than the width of the intermodal container.

11. The trailer of claim 1 further comprising a 12/24 VDC electrical system mounted thereon.

12. A method of transporting a container of a family of containers having a plurality of spaced tabs extending outwards from the bottom of opposed lateral sides, comprising:
   providing a trailer sized substantially to the size of the container;
   loading the container onto the trailer;
   securing the container to the trailer by a lockdown mechanism comprising a pair of rods, one on each lateral side of the container engaging the tabs, and releasably fastened at the front and rear end of the trailer;
   towing the trailer from a starting point to a destination.

13. The method of claim 12 further comprising providing the trailer with a height adjustable hitch.

14. The method of claim 12 further comprising loading and unloading the trailer with the container secured thereto into an intermodal container as an integrated unit.

* * * * *